United States Patent
Monma et al.

(10) Patent No.: US 10,738,166 B2
(45) Date of Patent: Aug. 11, 2020

(54) METHOD FOR PRODUCING POLYOXYMETHYLENE RESIN COMPOSITION

(71) Applicant: Polyplastics Co., Ltd., Tokyo (JP)

(72) Inventors: Tomohiro Monma, Fuji (JP); Kazufumi Watanabe, Fuji (JP); Akihide Shimoda, Fuji (JP)

(73) Assignee: POLYPLASTICS CO., LTD., Minato-ku, Tokyo (JP)

( * ) Notice: Subject to any disclaimer, the term of this patent is extended or adjusted under 35 U.S.C. 154(b) by 180 days.

(21) Appl. No.: 15/027,084

(22) PCT Filed: Sep. 9, 2014

(86) PCT No.: PCT/JP2014/073802
§ 371 (c)(1),
(2) Date: Apr. 4, 2016

(87) PCT Pub. No.: WO2015/075999
PCT Pub. Date: May 28, 2015

(65) Prior Publication Data
US 2016/0237221 A1    Aug. 18, 2016

(30) Foreign Application Priority Data

Nov. 21, 2013   (JP) ................. 2013-240853

(51) Int. Cl.
| | | |
|---|---|---|
| *C08K 5/098* | (2006.01) | |
| *C08J 3/20* | (2006.01) | |
| *C08L 23/08* | (2006.01) | |
| *C08L 59/04* | (2006.01) | |
| *C08J 3/00* | (2006.01) | |
| *C08K 5/13* | (2006.01) | |

(52) U.S. Cl.
CPC .............. *C08J 3/203* (2013.01); *C08J 3/005* (2013.01); *C08K 5/098* (2013.01); *C08L 23/0869* (2013.01); *C08L 59/04* (2013.01); *C08J 2359/02* (2013.01); *C08J 2433/08* (2013.01); *C08J 2433/10* (2013.01); *C08K 5/13* (2013.01)

(58) Field of Classification Search
CPC .................................. C08J 3/203; C08J 3/005
USPC ......................................................... 524/291
See application file for complete search history.

(56) References Cited

U.S. PATENT DOCUMENTS

| | | | | |
|---|---|---|---|---|
| 4,117,033 A * | 9/1978 | Gale | ........................ | C08L 59/02 524/100 |
| 4,169,867 A * | 10/1979 | Burg | ........................ | C08G 2/18 525/417 |
| 4,427,807 A * | 1/1984 | Zimmerman | ............ | C08G 2/18 523/466 |
| 4,792,579 A * | 12/1988 | Satoh | ..................... | C08K 5/521 524/145 |
| 5,128,405 A * | 7/1992 | Sugiyama | ............ | C08K 5/1345 524/291 |
| 5,300,545 A * | 4/1994 | Kazmierczak | ....... | C08K 5/3435 524/102 |
| 5,948,841 A * | 9/1999 | Nakamura | ............... | C08G 2/30 524/255 |
| 5,959,036 A * | 9/1999 | Yahiro | ..................... | C08K 3/26 525/154 |
| 6,284,828 B1 * | 9/2001 | Takayama | ............... | C08L 23/08 524/413 |
| 9,695,265 B2 * | 7/2017 | Horiguchi | ................ | C08G 2/06 |
| 10,577,496 B2 * | 3/2020 | Monma | .................. | C08K 5/098 |
| 2003/0162912 A1 | 8/2003 | Disch et al. | | |
| 2005/0088782 A1 * | 4/2005 | Horio | ................. | C08G 18/0895 360/254.8 |
| 2008/0271381 A1 | 11/2008 | Harashina et al. | | |

(Continued)

FOREIGN PATENT DOCUMENTS

| | | |
|---|---|---|
| EP | 0185543 | 6/1986 |
| EP | 1683838 A1 | 7/2006 |

(Continued)

OTHER PUBLICATIONS

Machine translation of JP 2003261714 A, published Sep. 2003, Karasawa et al. (Year: 2003).*

(Continued)

*Primary Examiner* — Jane L Stanley

(74) *Attorney, Agent, or Firm* — Knobbe, Martens, Olson & Bear LLP

(57) ABSTRACT

A polyoxymethylene resin composition from which formaldehyde is generated in a reduced amount upon molding, without carrying out a stabilization treatment for stabilizing an unstable terminal group in a crude oxymethylene copolymer. A hindered phenol-type antioxidant agent and an ethylene-(methacrylic acid) copolymer resin or an ethylene-(acrylic acid) copolymer resin or a salt thereof are melted and kneaded together to produce a polyoxymethylene resin composition without carrying out a stabilization treatment for stabilizing an unstable terminal group in a crude oxymethylene copolymer for which a polymerization catalyst is deactivated after the completion of copolymerization, and in which the unstable terminal group is not yet stabilized. When the polyoxymethylene resin composition is extrusion-molded, the discoloration of a molded product or the deterioration in properties of the molded product can be prevented for a long period of time. The resulting polyoxymethylene resin composition is suitable for forming an extrusion-molded article.

4 Claims, No Drawings

(56) References Cited

U.S. PATENT DOCUMENTS

| | | | |
|---|---|---|---|
| 2009/0264583 A1* | 10/2009 | Kurz | C08G 18/0895 524/539 |
| 2010/0093901 A1 | 4/2010 | Kawaguchi et al. | |
| 2013/0324675 A1* | 12/2013 | Luo | C08G 6/00 525/398 |
| 2017/0073451 A1* | 3/2017 | Horiguchi | C08G 2/04 |

FOREIGN PATENT DOCUMENTS

| | | | | |
|---|---|---|---|---|
| EP | 2036949 A1 | 3/2009 | | |
| JP | S61-145245 | 7/1986 | | |
| JP | 2000-017143 | 1/2000 | | |
| JP | 2000-017144 | 1/2000 | | |
| JP | 2000-239484 | 9/2000 | | |
| JP | 2000-239485 A | 9/2000 | | |
| JP | 2003261741 A * | 9/2003 | | C08L 59/04 |
| JP | 2007-112959 | 10/2005 | | |
| JP | 2006299107 | 11/2006 | | |
| JP | 2007-332227 | 12/2007 | | |
| JP | 2008-001850 | 1/2008 | | |
| JP | 2008-031348 | 2/2008 | | |
| JP | 2008-156489 A | 7/2008 | | |
| JP | 2009-286874 A | 12/2009 | | |
| JP | 2010-037445 | 2/2010 | | |
| JP | 2011225746 | 11/2011 | | |

OTHER PUBLICATIONS

Machine translation of JP 2000017144 A, published Jan. 2000, Ninokura et al. (Year: 2000).*

Notice of Reasons for Rejection issued to Japanese Patent Application No. 2013-240853, dated Jun. 23, 2015.

Trial decision issued in Japanese Patent Application No. 2013-240853, dated May 9, 2017.

Extended European search report in European Patent Application No. 14864530.2, dated Nov. 8, 2016.

JP Office Action received in Application No. 2018-216125, dated Oct. 23, 2019.

* cited by examiner

METHOD FOR PRODUCING POLYOXYMETHYLENE RESIN COMPOSITION

This application is the U.S. National Phase under 35 U.S.C. § 371 of International Application PCT/JP2014/073802, filed Sep. 9, 2014, designating the U.S., and published in Japanese as WO 2015/075999 on May 28, 2015, which claims priority to Japanese Patent Application No. 2013-240853, filed Nov. 21, 2013, the entire contents of which are incorporated herein by reference.

TECHNICAL FIELD

The present invention relates to a method for producing a polyoxymethylene resin composition.

BACKGROUND ART

Polyoxymethylene (also called polyacetal, and abbreviated as POM) resins have an excellent balance of mechanical properties, chemical resistance, sliding properties and the like, and further, their manufacture is easy, and as a result, they have become widely applied as exemplary engineering plastics centered around electric/electronic parts, automotive parts, and various other mechanical parts and the like.

There are also copolymers of polyoxymethylene polymer, and the copolymer is produced by polymerizing with formaldehyde or cyclic multimers thereof as the main monomer, and a cyclic ether and/or cyclic formal as the comonomer, under the presence of a catalyst.

However, a portion of the molecular terminals are unstable terminal groups in the obtained crude polyoxymethylene copolymer, and therefore it is thermally unstable, and when molding, there is thermal decomposition which generates formaldehyde, which may become an environmental problem. Further, the generated formaldehyde oxidizes during molding and becomes formic acid, and this formic acid can cause problems such as decomposing the polyoxymethylene copolymer, and foaming in the resin molded articles, and the like. Further, formic acid may become a cause of rust in metal parts in contact with the resin molding.

In consideration of the above, when obtaining polyoxymethylene resin pellets where various additives such as a formaldehyde scavenger, antioxidant, processing stabilizer, and heat resistance stabilizer and the like are added to a oxymethylene copolymer, normally, the unstable terminal groups of the crude oxymethylene copolymer are stabilized, and the above mentioned additives are added to the stabilized polyoxymethylene copolymer obtained by this stabilization to obtain the polyoxymethylene resin pellets.

As the method of stabilizing the crude polyoxymethylene copolymer, a method of decomposing and removing the unstable terminal groups and the unstable terminal portions which follow these is known.

For example, hydrolyzing the crude polyoxymethylene copolymer, more specifically, heating the crude polyoxymethylene copolymer to a temperature above its fusion point and treating in the fused state to decompose and remove the unstable terminal groups from the crude polyoxymethylene copolymer, or heating the crude polyoxymethylene copolymer at a temperature of 80° C. or more and holding a heterogeneous system in an insoluble liquid medium and decomposing and removing the unstable terminal groups from the crude polyoxymethylene copolymer, and the like are known (refer to Patent Document 1).

Further, using ammonia, an aliphatic amine such as triethylamine, tri-n-butylamine, triethanolamine, and the like, a quaternary ammonium salt such as tetrabutyl ammonium hydroxide and the like, or a hydroxide, inorganic weak acid salt, or organic acid salt of an alkali metal or alkaline earth metal, and decomposing the unstable terminal groups under its presence is also known (refer to Patent Document 2). Further, it has also been proposed to decompose the unstable terminal groups under the presence of a quaternary phosphonium salt, a PN bond-comprising compound, a heterocyclic quaternary ammonium salt, betaine, betaine derivative, amine oxide, or hydrazinium salt or the like (refer to Patent Documents 2 to 5).

Patent Document 1: Japanese Unexamined Patent Application, Publication No. 2010-37445
Patent Document 2: Japanese Unexamined Patent Application, Publication No. 2008-1850
Patent Document 3: Japanese Unexamined Patent Application, Publication No. 2008-31348
Patent Document 7: Japanese Unexamined Patent Application, Publication No. 2007-332227
Patent Document 5: Japanese Unexamined Patent Application, Publication No. 2007-112959

DISCLOSURE OF THE INVENTION

Problems to be Solved by the Invention

However, if it were possible to provide a polyoxymethylene resin composition where various additives are added, without carrying out a stabilizing treatment of the crude oxymethylene copolymer for stabilizing the unstable terminal groups, this would be preferable in the point of greatly simplifying the manufacturing process.

The present invention has the objective of providing a polyoxymethylene resin composition where the generated amount of formaldehyde when molding is sufficiently suppressed, without carrying out the above mentioned stabilization treatments.

Means for Solving the Problems

The present inventors, as a result of repeated diligent research in order to solve the above problem, discovered that the use of specific additives can solve the above mentioned problem, and thus completed the present invention. Specifically, the present invention provides the following.

(1) The present invention is a method of producing a polyoxymethylene resin composition wherein a crude oxymethylene copolymer for which a polymerization catalyst has been deactivated after completing the copolymerization but for which unstable terminal groups have not been stabilized, is melt-kneaded with a hindered phenol-type antioxidant, an ethylene-methacrylic acid copolymer resin or an ethylene-acrylic acid copolymer resin or a salt thereof, and an alkaline earth metal compound, without carrying out a stabilization treatment to stabilize the unstable terminal groups.

(2) Or, the present invention is a method of producing a polyoxymethylene resin composition according to (1), wherein the alkaline earth metal compound is an aliphatic carboxylic acid metal salt or an oxide.

(3) Or, the present invention is a method of producing a polyoxymethylene resin composition according to (1) or (2), wherein the alkaline earth metal compound is calcium stearate, and the calcium stearate is used in a range of 0.003 mass % to 0.020 mass % with respect to the crude oxymethylene copolymer.

(4) Or, the present invention is a method of producing a polyoxymethylene resin composition according to any one of (1) to (3), wherein the polyoxymethylene resin composition is used for forming an extrusion molded article.

Effects of the Invention

According to the present invention, it is possible to provide a polyoxymethylene resin composition which can sufficiently suppress the generated amount of formaldehyde when molding, without carrying out the above mentioned stabilization treatments.

PREFERRED MODE FOR CARRYING OUT THE INVENTION

Below, specific embodiments of the present invention are explained in detail, but the present invention is not in any way limited by the following embodiments, and may be practiced with suitable modifications made thereto provided that they are within the scope of the objective of the present invention.

<Method of Producing the Polyoxymethylene Resin Composition>

The present invention is a method of producing a polyoxymethylene resin composition wherein a crude oxymethylene copolymer for which the polymerization catalyst has been deactivated after the completion of the copolymerization but for which the unstable terminal groups have not been stabilized, is melt-kneaded with a hindered phenol-type antioxidant, an ethylene-methacrylic acid copolymer resin or an ethylene-acrylic acid copolymer resin or a salt thereof, and an alkaline earth metal compound.

[Crude Oxymethylene Copolymer]

In the present invention, the copolymer which becomes the raw material is a crude copolymer where the polymerization catalyst has been deactivated after the completion of the copolymerization, but where the unstable terminal groups have not been stabilized.

The crude oxymethylene copolymer is a resin which has oxymethylene groups (—$OCH_2$—) as its main structural units, and has comonomer units other than oxymethylene units. Generally, the crude oxymethylene copolymer is produced by copolymerizing with formaldehyde or a cyclic oligomer of formaldehyde as the main monomer, and a compound selected from a cyclic ether or cyclic formal as the comonomer.

As the main monomer, trioxane, which is a cyclic trimer of formaldehyde, is generally used. Trioxane is generally obtained by reacting a formaldehyde aqueous solution under the presence of an acid catalyst, and this is purified by a method such as distillation or the like, and used.

As the cyclic ether or cyclic formal which is the comonomer, ethylene oxide, propylene oxide, butylene oxide, cyclohexane oxide, oxetane, tetrahydrofuran, trioxepane, 1,3-dioxane, 1,3-dioxolane, propylene glycol formal, diethylene glycol formal, triethylene glycol formal, 1,4-butanediol formal, 1,6-hexanediol formal and the like may be mentioned. Further, it is possible to use a compound which can form a branched structure or crosslinked structure as the comonomer (or termonomer), and as such a compound, alkyl or aryl glycidyl ethers such as methyl glycidyl ether, ethyl glycidyl ether, butyl glycidyl ether, 2-ethyl-hexyl glycidyl ether, phenyl glycidyl ether and the like; diglycidyl ethers of alkylene glycols or polyalkylene glycols such as ethylene glycol diglycidyl ether, triethylene glycol diglycidyl ether, butanediol diglycidyl ether, and the like may be mentioned.

Among these, in the point of suitable thermal stability of the crude polyoxymethylene copolymer, the comonomer is preferably ethylene oxide, 1,3-dioxolane, 1,4-butanediol formal, or diethylene glycol formal. These comonomers may be used singly, or may be used in combinations of 2 or more.

The amount of the comonomer has a large influence on the thermal stability of the crude polyoxymethylene copolymer. The mass ratio of the main monomer to the comonomer is preferably 99.9:0.1 to 80.0:20.0, and more preferably 99.5:0.5 to 90.0:10.0.

Incidentally, in both of the main monomer and the comonomer, the content of impurities such as water, methanol, formic acid and the like is preferably extremely small. The impurities form unstable terminals in the polymerization system. The total amount of impurities is preferably $1 \times 10^{-2}$ mol % or less with respect to the total monomers in the reaction system, more preferably $5 \times 10^{-3}$ mol % or less.

The crude oxymethylene copolymer is generally obtained by adding a suitable amount of a molecular weight modifier, and performing cationic polymerization using a cationic polymerization catalyst. The used molecular weight modifier, cationic polymerization catalyst, polymerization method, polymerization apparatus and the like are well known from many publications, and basically any of these may be utilized. For example, to avoid the formation of unstable terminals, a low molecular weight linear acetal or the like having alkoxy groups at both terminals, such as methylal, may be included in a discretionary amount with the objective of adjusting the molecular weight of the crude polyoxymethylene copolymer.

As the catalyst used during the polymerization reaction, lead tetrachloride, tin tetrachloride, titanium tetrachloride, aluminum trichloride, zinc chloride, vanadium trichloride, antimony trichloride, phosphorous pentafluoride, antimony pentafluoride, boron trifluoride, boron trifluoride coordination compounds such as boron trifluoride diethyl etherate, boron trifluoride dibutyl etherate, boron trifluoride dioxanate, boron trifluoride acetic anhydride, boron trifluoride triethylamine complex compounds and the like, inorganic and organic acids such as perchloric acid, acetyl perchlorate, t-butyl perchlorate, hydroxyacetic acid, trichloroacetic acid, trifluoroacetic acid, trifluoromethanesulfonic acid, p-toluenesulfonic acid and the like, complex salt compounds such as triethyloxonium tetrafluoroborate, triphenylmethyl hexafluoroantimonate, allyl diazonium hexafluorophosphate, allyl diazonium tetrafluoroborate and the like, alkyl metal salts such as diethyl zinc, triethyl aluminum, diethyl aluminum chloride and the like, heteropoly acids, isopoly acids, and the like. Among these, in particular, boron trifluoride, boron trifluoride coordination compounds, heteropoly acids, and trifluoromethanesulfonic acid are preferable. These catalysts can also be used diluted in advance in an organic solvent.

The amount of the catalyst, in the case that a catalyst consisting of boron trifluoride or its coordination compounds is used, is preferably in the range of $1 \times 10^{-3}$ mol % to $1 \times 10^{-2}$ mol % with respect to the total monomers, more preferably in the range of $5 \times 10^{-3}$ mol % to $7 \times 10^{-3}$ mol %. Limiting the amount of the catalyst to the above range effectively increases the prevention of generation of unstable terminal portions. If the amount of the catalyst is too large, is it difficult to suitably control the polymerization temperature, decomposition reactions become predominant in the polymerization, and as a result, a large excess of unstable terminal portions is generated. On the other hand, if the amount of the catalyst is too small, this can invite a reduction of the polymerization rate or the polymerization yield, which is not preferable.

As the polymerization method, any publicly known method is possible, but a continuous bulk polymerization method which yields a solid powder bulk of the polymer as the polymerization using liquid monomers progresses, is industrially preferable. The polymerization temperature is preferably held at 60° C. to 105° C., and in particular, 65° C. to 100° C. is desirable.

The deactivation method of the catalyst after the polymerization is not particularly limited, and any publicly known method is possible. For example, in the case of using a catalyst consisting of boron trifluoride or its coordination compounds, a method of adding the polymer after polymerization to an aqueous solution or the like comprising a basic compound, or the like, is possible. As the basic compound, ammonia, or an amine such as triethylamine, tributylamine, triethanolamine, tributanolamine or the like, or an oxide, hydroxide or salt of an alkali metal or an alkaline earth metal, or other publicly known catalyst quencher can be mentioned. The basic compound is preferably added as an aqueous solution of 0.001 mass % to 0.5 mass %, is preferably added as an aqueous solution of 0.02 mass % to 0.3 mass %. Further, a preferable temperature of the aqueous solution is 10° C. to 80° C., and 15° C. to 60° C. is particularly preferable. Further, after the conclusion of the polymerization, it is preferably quickly introduced into these aqueous solutions to deactivate the catalyst.

The molecular weight of the crude oxymethylene copolymer is not particularly limited, but is preferably a weight average molecular weight of 10,000 to 400,000. Further, the melt index, which is an indicator of the fluidity of the resin, is preferably 0.1/10 min to 100 g/10 min, and more preferably 0.5/10 min to 80 g/10 min. In the present specification, the melt index is the value measured with a load of 2.16 kg at 190° C. in conformity with ASTM-D1238.

[Crude Oxymethylene Copolymer for Which Stabilization Treatment Has Not Been Performed]

In the present invention, the crude oxymethylene copolymer has the polymerization catalyst deactivated after the completion of the copolymerization, but the unstable terminal groups have not been stabilized. Then, without carrying out a stabilization treatment for stabilizing the unstable terminal groups, the crude oxymethylene copolymer and various additives are melt-kneaded.

Herein, the terminal groups of the crude oxymethylene copolymer, and the stabilization treatment of the unstable terminal groups will be explained. The stable terminal groups of the crude oxymethylene copolymer are alkoxy groups such as methoxy groups (—OCH$_3$) and the like, and hydroxyalkoxy groups with a carbon number of 2 or more such as hydroxyethyl groups (—CH$_2$CH$_2$OH), hydroxybutyl groups (—CH$_2$CH$_2$CH$_2$CH$_2$OH) and the like. On the other hand, the unstable terminal groups of the crude oxymethylene copolymer are hemiacetal terminal groups (hydroxymethoxy terminal groups, also called hemiformal terminal groups, represented by —OCH$_2$OH) and formyl terminal groups (represented by —CHO).

Generally, by going through a stabilization step, the proportion of unstable terminal groups included in the oxymethylene copolymer can be reduced, and a stabilized oxymethylene copolymer can be obtained. As the stabilization treatment, decomposing and removing only the unstable portions by heating the polyoxymethylene copolymer to a temperature above its fusion point and treating in a molten state, or decomposing and removing only the unstable portions by holding a heterogeneous system in an insoluble liquid medium and heat treating at a temperature of 80° C. or more, and the like are known.

Further, heat treatment of the crude polyoxymethylene copolymer under the presence of an unstable terminal group decomposition treatment agent is also known. As the unstable terminal group decomposition treatment agent, ammonia, aliphatic amines such as triethylamine, tri-n-butylamine, triethanolamine and the like, quaternary ammonium salts such as tetrabutyl ammonium hydroxide and the like, a hydroxide, inorganic weak acid salt or organic acid salt of an alkaline metal or alkali earth metal, as well as quaternary phosphonium salts, PN bond-comprising compounds, heterocyclic quaternary ammonium salts, betains, betain derivatives, amine oxides, or hydrazinium salts have also been proposed (refer to Patent Documents 2 to 5).

The present invention is characterized in obtaining a polyoxymethylene resin composition where specified additives are added to a crude oxymethylene copolymer without carrying out these stabilization treatments. Below, these specified additives are explained.

[Hindered Phenol-Type Antioxidant]

In the present invention, a hindered phenol-type antioxidant is added to the above mentioned crude oxymethylene copolymer.

As the hindered phenol-type antioxidant used in the present invention, monocyclic hindered phenol compounds, polycyclic hindered phenol compounds connected by groups comprising hydrocarbon groups or sulfur atoms, hindered phenol compounds having ester groups or amide groups, and the like may be mentioned.

As specific compounds thereof, 2,6-di-t-butyl-p-cresol, 2,2'-methylene bis(4-methyl-6-t-butylphenol), 4,4'-methylene bis(2,6-di-t-butylphenol), 1,1,3-tris-(2-methyl-4-hydroxy-5-t-butylphenyl)butane, 4,4'-butylidene bis(3-methyl-6-t-butylphenol), 1,3,5-trimethyl-2,4,6-tris(3,5-di-t-butyl-4-hydroxybenzyl)benzene, 4,4'-thio bis(3-methyl-6-t-butylphenol), n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol-bis[3-(3,5-di-t-butyl-4-hydroxyphenyl)propionate], ethylene bis(oxyethylene) bis[3-(5-tert-butyl-4-hydroxy-m-tolyl) propionate], pentaerythritol tetrakis[3-(3,5-di-t-butyl-4-hydroxyphenyl)propionate], 3,9-bis[2-{3-(3-t-butyl-4-hydroxy-5-methylphenyl)propionyloxy}-1,1-dimethylethyl]-2,4,8,10-tetraoxaspiro[5.5]undecane, 2-t-butyl-6-(3'-t-butyl-5'-methyl-2'-hydroxybenzyl)-4-methylphenylacrylate, 2-[1-(2-hydroxy-3,5-di-t-pentylphenyl)ethyl]-4,6-di-t-pentylphenylacrylate, di-n-octadecyl-3,5-di-t-butyl-4-hydroxybenzylphosphonate, N,N'-hexamethylene bis(3,5-di-t-butyl-4-hydroxy-dihydrocinnamamide), N,N'-ethylene bis[3-(3,5-di-t-butyl-4-hydroxyphenyl)propionamide], N,N'-tetramethylene bis[3-(3,5-di-t-butyl-4-hydroxyphenyl)propionamide], N,N'-hexamethylene bis[3-(3,5-di-t-butyl-4-hydroxyphenyl)propionamide], N,N'-ethylene bis[3-(3-t-butyl-5-methyl-4-hydroxyphenyl)propionamide], N,N'-hexamethylene bis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris(3,5-di-t-butyl-4-hydroxybenzyl) isocyanurate, 1,3,5-tris(4-t-butyl-3-hydroxy-2,6-dimethylbenzyl)isocyanurate, and the like may be mentioned as examples.

These hindered phenol-type antioxidants may be used individually or may be used in combinations of two or more.

The added amount of the hindered phenol-type antioxidant is not particularly limited, but is preferably 0.01 mass % to 3 mass % with respect to the crude oxymethylene copolymer, and more preferably 0.05 mass % to 2 mass %. If the added amount of the hindered phenol-type antioxidant is less than 0.01 mass %, there is the possibility that the workability and material characteristics over long term use will degrade, which is not preferable. If the added amount of the hindered phenol-type antioxidant is more than 3 mass %, there is the possibility that it will be exuded from the molded article, and also from the viewpoint of cost, this is not preferable.

Incidentally, as the antioxidant, besides hindered phenol-type antioxidants, it is also known to use hindered amine-type antioxidants, phosphorous type secondary antioxidants, and sulfur type secondary antioxidants. In the present invention, provided that they do not interfere with the addition of these antioxidants, in addition to the hindered phenol-type antioxidants, it is also possible to add in combination a hindered amine-type antioxidant.

[Ethylene-Methacrylic Acid Copolymer Resin or Ethylene-Acrylic Acid Copolymer Resin or Salt Thereof]

In the present invention, an ethylene-methacrylic acid copolymer resin or ethylene-acrylic acid copolymer resin or a salt thereof is added to the above mentioned crude oxymethylene copolymer. By adding ethylene-methacrylic acid copolymer resin or ethylene-acrylic acid copolymer resin or salt thereof, it is possible to suitably suppress the amount of formaldehyde generated when molding the resin composition, even in the case of adding additives to the crude oxymethylene copolymer without carrying out a stabilization treatment.

The ethylene-methacrylic acid copolymer resin or ethylene-acrylic acid copolymer resin or salt thereof may be used individually or may be used in combinations of two or more. The added amount of the ethylene-methacrylic acid copolymer resin or ethylene-acrylic acid copolymer resin or the salt thereof is not particularly limited, but is preferably 0.01 mass % to 2 mass % with respect to the crude oxymethylene copolymer, and more preferably 0.015 mass % to 1 mass %. If the added amount of the ethylene-methacrylic acid copolymer resin or ethylene-acrylic acid copolymer resin or the salt thereof is less than 0.01 mass %, sufficient effects cannot be obtained, which is not preferable. If the added amount of the ethylene-methacrylic acid copolymer resin or the salt thereof is more than 2 mass %, there is the possibility of separation from the molded article, which is not preferable.

[Alkaline Earth Metal Compound]

As the alkaline earth metal compound, salts of alkaline earth metals (calcium, magnesium and the like) with organic carboxylic acids; metal oxides such as CaO, MgO and the like; metal carbonates such as $CaCO_3$, $MgCO_3$ and the like; and metal inorganic acid salts such as salts of alkaline earth metals (calcium, magnesium and the like) with boric acid or phosphoric acid or the like may be mentioned as examples.

As the carboxylic acid constituting the carboxylic acid metal salt, a saturated or unsaturated aliphatic carboxylic acid with a carbon number of 1 to 36 or the like may be used. Further, these aliphatic carboxylic acids may have a hydroxyl group.

As the saturated aliphatic carboxylic acid, saturated C1 to C36 monocarboxylic acids such as acetic acid, propionic acid, butyric acid, capronic acid, caprylic acid, lauric acid, myristic acid, palmitic acid, stearic acid, arachidic acid, behenic acid, lignoceric acid, cerotic acid, montanic acid, melissic acid, ceroplastic acid and the like, polyvalent carboxylic acids such as saturated C3 to C36 dicarboxylic acids such as oxalic acid, malonic acid, succinic acid, adipic acid and the like, and saturated C6 to C36 tricarboxylic acids such as tricarballylic acid, butanetricarboxylic acid and the like, or their oxyacids (for example, lactic acid, hydroxybutyric acid, hydroxylauric acid, hydroxypalmitic acid, hydroxystearic acid, malic acid, citric acid and the like), and the like may be mentioned as examples.

As the unsaturated aliphatic carboxylic acid, unsaturated C3 to C36 carboxylic acids such as undecylenic acid, oleic acid, elaidic acid, cetoleic acid, erucic acid, brassidic acid, sorbic acid, linolic acid, linoleic acid, arachidonic acid and the like, or their hydroxyacids (for example, propiolic acid, stearolic acid and the like), and the like may be mentioned as examples.

As the aliphatic carboxylic acid, the one preferably used is calcium stearate.

The above mentioned alkaline earth metal compound may be used individually or in combinations of two or more, and the proportion thereof is preferably 0.001 mass % to 2 mass % with respect to the crude oxymethylene copolymer, and more preferably 0.003 mass % to 0.020 mass %.

Incidentally, as a formaldehyde scavenging agent, amino triazine compounds such as melamine, urea compounds, carboxylic acid hydrazide compounds, polyurethane resins, polyacrylamide resins, polyamide resins and the like are known. The present invention does not preclude the addition of these formaldehyde scavenging agents.

[Other Additives]

It is possible to use further publicly known additives with the crude polyoxymethylene copolymer of the present invention.

In the case of use for an extrusion molding application, as a sliding property enhancing agent, an olefin-type polymer (polyethylene, polypropylene, a copolymer of ethylene and an α-olefin, their modifications and the like by acid anhydrides and the like), waxes (polyethylene wax and the like), silicone oil or silicone-type resins, fluorine-type resins (polytetrafluoroethylene and the like), aliphatic esters, and the like may be used.

Further, a publicly known lubricant, weathering (light) stabilizing agent, impact strength modifier, gloss control agent, filler, colorant, nucleating agent, antistatic agent, surfactant, antimicrobial agent, antifungal agent, aromatic, foaming agent, compatibilizer, property modifier (boric acid or its derivatives or the like), fragrance or the like may be included, and various characteristics may be improved by adding the respective additives without impeding the objective of the present invention.

[Production of the Polyoxymethylene Resin Composition]

The method of producing the polyoxymethylene resin composition is not particularly limited, and as the method for preparing the resin composition, it may be prepared by various methods known from the prior art. For example, (1) a method of obtaining a composition in pellet form by mixing all of the components constituting the composition, and supplying this to an extruder and melt kneading, (2) a method of obtaining a composition in pellet form by supplying one part of the components of the composition from a main feed of an extruder, and supplying the remaining components from a side feed of the extruder, and melt kneading, or (3) a method of preparing temporary pellets of differing compositions by extrusion or the like, and mixing these pellets to prepare the prescribed composition.

In the preparation of the composition using the extruder, it is preferable to use an extruder having a degassing vent opening at one or more places, and further, it is preferable to supply water or a low-boiling alcohol within a range of approximately 0.1 parts by mass to 10 parts by mass with respect to 100 parts by mass of the crude oxymethylene copolymer at a discretionary location from the main feed to the degassing vent opening, to degas and remove formaldehyde and the like generated in the extrusion step along with the water or low-boiling alcohol. In this way, it is possible to reduce the amount of formaldehyde generated from the polyoxymethylene resin composition and the molded article thereof.

Further, when forming the resin molded article, in the point of ease of manufacture, it is suitable for the polyoxymethylene resin composition of the present invention to be in pellet form.

[Formation of the Resin Molded Article Using the Polyoxymethylene Resin Composition]

From the prior art, as a technique of forming a resin molded article using a resin composition, injection molding, extrusion molding, compression molding, blow molding, vacuum molding, foam molding, rotational molding and the like are known. When forming a molded article using the resin composition according to the present invention, it is possible to suitably form the molded article according to any of these common molding methods.

Incidentally, extrusion molding has advantages in the point that it is possible to form resin molded articles having complex cross sectional forms, in the point that because the only stresses applied to the resin composition are compressive stress and shearing stress, even when the resin composition is a fragile material it can be suitably molded, and in the point that the molded article surface after extrusion is extremely smooth and a finishing treatment is unnecessary, and the like. On the other hand, it has the disadvantage that while the resin composition stays in the inner portion of the molding apparatus, deterioration of the formulated components, or secondary reactions with formaldehyde may occur, which cause defects in appearance such as yellowing or the like of the resin molded article to arise.

When using the polyoxymethylene resin composition of the present invention, even in the case of extrusion molding, it is possible to prevent the degradation of the formulated components or secondary reactions with formaldehyde. Therefore, the polyoxymethylene resin composition of the present invention is particularly suitable for the use of forming an extrusion molded article.

EXAMPLES

Below, the present invention is specifically explained with examples, but the present invention is not limited to these examples.

<Preparation of the Crude Oxymethylene Copolymer>

Using a continuous mixing reactor having a cross sectional form of two circles which partially overlap, and a barrel provided with a jacket though which a heating (cooling) medium flows on the outer side, and in the lengthwise direction of the inner portion of this barrel, two rotating shafts each provided with respective paddles for mixing and driving, the following polymerization reaction was carried out.

Hot water at a temperature of 80° C. was passed through the jacket, and the two rotating shafts were rotated at a rate of 100 rpm, and trioxane comprising 0.05 mass % of triethylene glycol-bis[3-(3-t-butyl-5-methyl-4-hydroxyphenyl)propionate] as an antioxidant, 3.3 mass % of 1,3-dioxolane as a comonomer, 700 ppm (mass based) of methylal as a chain transfer agent, was continuously supplied to the reactor, and along with this, in parallel, a solution (1 mass % concentration) of boron trifluoride·dibutyl etherate dissolved in cyclohexane was continuously added at a concentration of 10 ppm (mass based) of boron trifluoride to the total monomers (the total amount of trioxane and 1,3-dioxolane), and copolymerization was carried out. Next, to the crude polyoxymethylene copolymer discharged from the exhaust opening of the reactor, an aqueous solution comprising 0.1 mass % of triethylamine was added, and the catalyst was deactivated. This mixture was subjected to centrifugation treatment, and further dried, to obtain the crude oxymethylene copolymer.

In the crude oxymethylene copolymer, the hemiacetal terminal group amount was 2.2 mmol/kg, and the formyl terminal group amount was 1.7 mmol/kg, and the unstable terminal group amount (the amount of the terminal unstable portions) was 1.18 mass %.

Further, in the present invention, the hemiacetal terminal group amount and the formyl terminal group amount were evaluated by the following technique.

The crude oxymethylene copolymer was dissolved in hexafluoroisopropyl alcohol, and N,O-bis(trimethylsilyl)trifluoroacetamide and pyridine were added and after reacting and air drying, vacuum drying was performed at 400° C. to remove the remaining solvent and unreacted substances. The obtained reaction product was dissolved in deuterated hexafluoroisopropyl alcohol with a concentration of 5 mass %, the solution was filled into a sample vial for NMR, and the NMR spectrum was measured at room temperature (refer to Japanese Unexamined Patent Application, First Publication No. 2001-11143).

The hemiacetal terminal group amount (mmol/kg) and the formyl terminal group amount (mmol/kg) were each calculated based on the corresponding NMR absorption peaks.

NMR Device: AVANCE 400 type FT-NMR manufactured by Brucker Corporation

Measurement Conditions: Pulse Flip Angle 30°, integration repetition time 10 sec, number of integrations 128 times Further, in the present invention, the unstable terminal amount (the amount of the unstable portions of the terminals) was evaluated by the following technique.

About 1 g of the crude oxymethylene copolymer was precisely weighed, and was introduced into a pressure resistant closed reaction vessel along with 15 mg of calcium hydroxide and 100 ml of a 60 vol % methanol aqueous solution comprising 0.5 vol % ammonium hydroxide, and after heat treating at 170° C. for 60 min, the vessel was cooled, opened, and the solution inside was removed. The amount of formaldehyde dissolved in the solution, arising from the decomposition of the unstable terminal portions was measured according to the JIS K0102, item 29.1, acetylacetone absorption photometry, and the proportion with respect to the crude oxymethylene copolymer was calculated as mass %.

<Preparation of the Stabilized Oxymethylene Copolymer>

With respect to 100 parts by mass of the above crude polyoxymethylene copolymer, 0.01 parts by mass of triethylene glycol-bis[3-(3-t-butyl-5-methyl-4-hydroxyphenyl)propionate] and 2 parts by mass of triethylammonia aqueous solution (0.72 mass % concentration: the triethylamine was 1.4 mmol calculated for a teritary amine nitrogen per 1 kg of the crude polyoxymethylene copolymer) were added and uniformly mixed.

Next, this mixture was supplied to the above mentioned twin extruder having a degassing opening, with a vent vacuum of 20 mmHg (2.7 kPa), a cylinder temperature of 200° C., and an average residence time of 300 sec, the volatile matter was removed from the degassing opening (vent) while melt-kneading, and a stabilized oxymethylene copolymer was obtained in pellet form.

In the stabilized oxymethylene copolymer, the hemiacetal terminal group amount was 1.2 mmol/kg, the formyl terminal group amount was 1.3 mmol/kg, and the unstable terminal amount (the amount of the terminal unstable portions) was 0.56 mass %.

Example, Reference Example and Comparative Example

TABLE 1

|  | Example | | | | | | Reference Example | Comparative Example | |
| --- | --- | --- | --- | --- | --- | --- | --- | --- | --- |
|  | 1 | 2 | 3 | 4 | 5 | 6 | 1 | 1 | 2 |
| Crude POM copolymer | 99.38 | 99.38 | 99.38 | 99.38 | 99.38 | 99.38 |  | 99.4 | 99.38 |
| Stabilized POM copolymer |  |  |  |  |  |  | 99.4 |  |  |
| Hindered phenol-type antioxidant | 0.3 | 0.3 | 0.3 | 0.3 | 0.3 | 0.3 | 0.3 | 0.3 | 0.3 |
| Ethylene-methacrylic acid copolymer resin | 0.02 | 0.02 | 0.02 |  | 0.02 |  |  | 0.02 |  |
| Ethylene-acrylic acid copolymer resin |  |  |  | 0.02 |  |  |  |  |  |
| Ethylene-methacrylic acid copolymer resin zinc salt |  |  |  |  |  | 0.02 |  |  |  |
| Calcium stearate | 0.005 | 0.02 | 0.1 | 0.02 |  | 0.02 | 0.1 |  | 0.1 |
| Magnesium oxide |  |  |  |  | 0.02 |  |  |  |  |
| Sliding property enhancing agent | 0.3 | 0.3 | 0.3 | 0.3 | 0.3 | 0.3 | 0.3 | 0.3 | 0.3 |

(units are mass %)

In Table 1, the various materials are as follows.
1. Crude POM copolymer
   The crude oxymethylene copolymer obtained by the above mentioned <Preparation of the Crude Oxymethylene Copolymer>
2. Stabilized POM copolymer
   The stabilized oxymethylene copolymer obtained by the above mentioned <Preparation of the Stabilized Oxymethylene Copolymer>
3. Hindered phenol-type antioxidant
   pentaerythritol tetrakis[3-(3,5-di-t-butyl-4-hydroxyphenyl)propionate] (product mane: Irganox 1010, manufactured by BASF Japan Ltd.)
4. Ethylene-methacrylic acid copolymer resin
   ethylene-methacrylic acid copolymer resin (product name: Nucrel N1525, manufactured by Du Pont-Mitsui Polychemicals Co., Ltd.)
5. Ethylene-acrylic acid copolymer resin (product name: Primacor 3460, manufactured by The Dow Chemical Company)
6. Zinc salt of ethylene-methacrylic acid copolymer resin
7. Alkaline earth metal compound
   calcium stearate
   magnesium oxide
8. Sliding property enhancing agent
   low molecular weight polyethylene (product name: Sanwax 161-P, Sanyo Chemical Industries, Ltd.)

The materials shown in Table 1, in the proportions shown in Table 1 (the units are parts by mass) were input into a TEX 30α extruder (The Japan Steel Works, Ltd.). Next, the above mentioned raw materials which are input into the extruder are kneaded under the extrusion conditions below. Next, the kneaded raw materials are extruded in a strand form, and after cooling, cut into pellets, and dried at 140° C. for 4 hrs. In this way, the polyoxymethylene resin composition pellets (diameter: 1 to 2 mm, length 2 to 3 mm) according to the Examples and Comparative Examples were produced.
(Extrusion Conditions)
   Cylinder temperature: 170 to 200° C.
   Extrusion amount: 18 kg/hr (using fixed quantity feeder)
   Rotation rate: 120 rpm <Evaluation>
[Amount of Formaldehyde Generated from Melt]
5 g of the pellets were precisely weighed, and after holding in a metal vessel at 200° C. for 5 min, the atmosphere inside the vessel was absorbed into distilled water. The amount of formaldehyde of this aqueous solution was quantified according to JISK0102, item 29. (formaldehyde item), and the amount of formaldehyde gas generated by the pellets (ppm) was calculated. If the formaldehyde gas amount was less than 70 ppm, it was judged as "○", and if it was 70 ppm or more, it was judged as "x". The results are shown in Table 2.

[Long Term Color Stability (ΔE)]
Using the above mentioned composition pellets, and using a 30 mm uniaxial solidification extrusion molding device, with an extrusion rate of 5 mm/min, round bars with φ140 were solidification extruded. Then, the obtained round bar was cut into test pieces according to the ISO 527-11B model.

After this, the above mentioned test pieces were held in an oven at 140° C. for a long period, and the color was evaluated using a colorimeter. The color change degree (ΔE) was calculated as below.

$$\Delta E=[(L_1-L_0)^2+(a_1-a_0)^2+(b_1-b_0)^2]^{1/2}$$

In the formula, L, a, and b are respectively values of color measured by a color difference meter, and the subscript "1" for L, a, and b indicates the colors after holding in a oven at 140° C. for 20 days, and the subscript "0" indicates the colors measured immediately before putting in the oven.

Then, when the calculated results were less than 10, it was deemed "⊚", and if from 10 to 15, it was deemed as "○". The results are shown in Table 2.

The test pieces prepared for the above mentioned [Long Term Color Stability (ΔE)] were held in an oven at 140° C. for 20 days, and the tensile strength was evaluated. The evaluations were according to ISO 527. If the tensile strength retention rate after long term holding was 100% or more with respect to the tensile strength before long term holding, they were evaluated as "○", and if the tensile strength rate was less than 100%, the tensile strength retention rate was evaluated as "x". The results are shown in FIG. 2.

TABLE 2

|  | Example | | | | | | Reference Example | Comparative Example | |
| --- | --- | --- | --- | --- | --- | --- | --- | --- | --- |
|  | 1 | 2 | 3 | 4 | 5 | 6 | 1 | 1 | 2 |
| Generated amount of formaldehyde (Unit: ppm) | 52 ○ | 55 ○ | 60 ○ | 57 ○ | 55 ○ | 58 ○ | 62 ○ | 55 ○ | 105 X |
| Long term color stability (ΔE) | 8.3 ⊚ | 7.1 ⊚ | 11 ○ | 7.5 ⊚ | 8.2 ⊚ | 7.6 ⊚ | 10.5 ○ | 7.5 ⊚ | 11.3 ○ |
| Long term properties (Tensile strength retention rate) | ≥100 ○ | ≥100 ○ | ≥100 ○ | ≥100 ○ | ≥100 ○ | ≥100 ○ | ≥100 ○ | 85 X | ≥100 ○ |

On comparing Examples 1 to 6 and Reference Example 1, it can be said that in the case of using a polyoxymethylene resin composition obtained by melt kneading a crude oxymethylene copolymer with a hindered phenol-type antioxidant and an ethylene-methacrylic acid copolymer resin or an ethylene-acrylic acid copolymer resin or their salts as a material for forming a resin molded article, even though no stabilizing treatment for stabilizing the unstable terminal groups has been carried out, it was possible to suppress the generated amount of formaldehyde to approximately the same degree as for the case of using a polyoxymethylene resin composition obtained from a stabilized oxymethylene copolymer for which the stabilization treatment has been carried out. From this, it can be said that according to the present invention, it is possible to provide a polyoxymethylene resin composition where the generated amount of formaldehyde when molding is sufficiently suppressed, even without carrying out the above mentioned stabilization treatment.

Further, even when the polyoxymethylene resin composition was extrusion molded, long term color changes and long term property deterioration was suppressed, whereby the polyoxymethylene resin composition of the present invention was suitable for forming extrusion molded articles (Examples 1 to 6).

On the other hand, in the case of using an ethylene-methacrylic acid copolymer resin singly as an additive, and further extrusion molding the polyoxymethylene resin composition, it was not possible to suppress degradation of the long term property retention rate (Comparative Example 1). Also, the case of using an alkaline earth metal compound was unsuitable because it was not possible to appropriately suppress the generated amount of formaldehyde (Comparative Example 2).

The invention claimed is:

1. A method of producing a polyoxymethylene resin composition, comprising supplying and melt-kneading the following:
   a crude oxymethylene copolymer for which a polymerization catalyst has been deactivated after completing the copolymerization but for which unstable terminal groups have not been stabilized,
   a hindered phenol-type antioxidant,
   an ethylene-methacrylic acid copolymer resin, and
   an alkaline earth metal compound,
   without carrying out a stabilization treatment to stabilize the unstable terminal groups, and in the absence of a salt of said ethylene-methacrylic acid copolymer resin,
   wherein an extruder having a degassing vent opening at one or more places is used, and
   wherein at least one selected from water and a low-boiling alcohol is further supplied within a range of 0.1 parts by mass to 10 parts by mass with respect to 100 parts by mass of the crude oxymethylene copolymer at a discretionary location from the main feed to the degassing vent opening.

2. A method of producing a polyoxymethylene resin composition according to claim 1, wherein the alkaline earth metal compound is an aliphatic carboxylic acid metal salt or an oxide.

3. A method of producing a polyoxymethylene resin composition according to claim 1, wherein the alkaline earth metal compound is calcium stearate, and further, the calcium stearate is used in a range of 0.003 mass % to 0.020 mass % with respect to the crude oxymethylene copolymer.

4. A method of producing a polyoxymethylene resin composition according to claim 1, wherein the polyoxymethylene resin composition is used for forming an extrusion molded article.

* * * * *